J. A. COX.
Cotton-Planter.
No. 65,647.
Patented June 11, 1867.
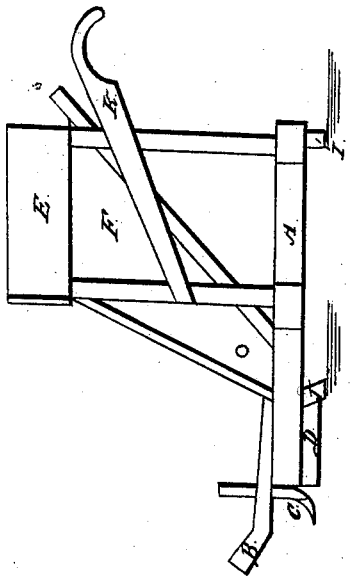
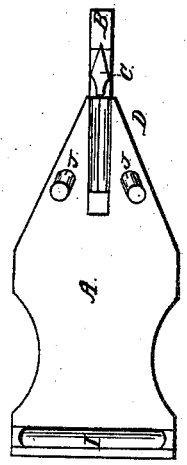
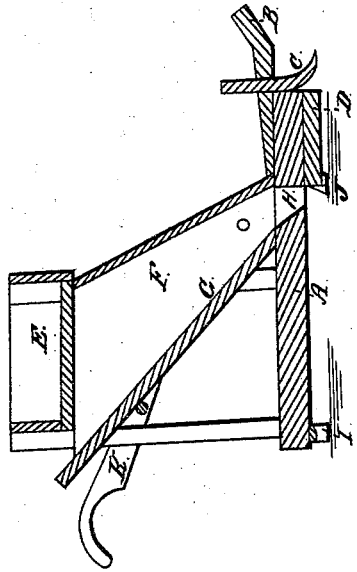
Witnesses:
A. Wickham Axe
R. H. Seaton
Inventor:
J. A. Cox
By How & Weston
Attys

United States Patent Office.

J. A. COX, OF HUMBOLDT, TENNESSEE.

Letters Patent No. 65,647, dated June 11, 1867.

---

COTTON-SEED PLANTER.

---

*The Schedule referred to in these Letters Patent and making part of the same.*

---

Specification of certain improvements in Cotton-Seed Planters invented by J. A. Cox, of Humboldt, in the county of Gibson, and State of Tennessee.

My invention is intended to provide a means for planting and covering cotton-seed at one operation in a neat, rapid, and effective manner, after the ground has been properly prepared; and it consists, first, in the combination, with the seed-box and tunnel or hopper through which the seed are fed by hand, of a coulter for loosening the soil, and an opener for making the shallow furrow or drill into which the seed are to be dropped; second, in the combination with the coulter and opener of two or more harrow-teeth, which enter the ground at either side of the ridge in which the cotton is planted, thereby aiding to keep the coulter and opener in the centre of the said ridge, so that the planter may be managed with one hand, except in turning around; and, third, in the combination, with the opener and seed tunnel or hopper, of a coverer which fills up the furrow, covering the seed and leaving the ridge smooth behind it. In the accompanying drawings—

Figure 1 is a side elevation of my improved cotton-seed planter.

Figure 2 is a central longitudinal section from top to bottom of the same.

Figure 3 is a bottom view of the same.

Figure 4 is a rear view of the base, coverer, harrow-teeth, and opener.

A is the base, to which the rest of the machine is attached. B is a beam, to which the draught animal is attached, one mule being sufficient. C is a coulter, which loosens up the soil as the machine advances, preparing it for the opener D. This opener is a solid block of wood, triangular in form, about one foot long and five inches deep. It is fastened to the base A immediately behind the coulter C, and opens a drill or furrow, into which the seed are dropped. E is the seed-box, containing a supply of seed. The seed are taken from this box by hand, and fed into the tunnel or hopper E, when they slide down the incline G, and fall through the opening H and into the furrow immediately behind the opener D. As the machine advances the coverer I pushes the soil into the drill or furrow, and covers the seed. The coverer I is of sufficient length to reach from side to side of the ridge, and is hollowed out in the centre, as seen in fig. 4, so as to leave the ridge slightly rounded on top. J J are ordinary harrow-teeth, set each side of the opener D, and sufficiently removed from it so as not to interfere with its efficient working, and they serve to aid in keeping the machine from running to one side. With these teeth, in combination with the coulter and opener, the planter can be managed with one hand, except when turning at the end of the furrow, when both hands may be used, the necessity for using one hand to drop or feed seed from the seed-box E to the hopper F being for the time suspended. K K are the handles of the feeder, which are used in managing it.

The advantages of this planter are, that the seed can be planted much more evenly than by the usual method; a man with the machine and one mule can do as much work as three persons and two mules or horses have heretofore done. The machine, from its construction, is kept very easily on the ridge, and there is scarcely ever any necessity of using both hands in its management, except when turning at the end of a row. This leaves one hand free at all times when the machine is in motion to feed down the seed through the hopper F.

Having thus fully described my invention, I claim—

1. The combination, with the seed-box E and hopper F, of the coulter C and opener D, substantially as and for the purpose set forth.

2. The combination with the coulter C and opener D of two harrow-teeth J J, substantially as and for the purpose specified.

3. The combination with the opener D and hopper F of the coverer I, substantially as and for the purpose hereinabove set forth.

J. A. COX.

Witnesses:
T. J. CRADDOCK,
NEEDHAM MOORE.